United States Patent
Nickerson et al.

(10) Patent No.: US 6,402,171 B1
(45) Date of Patent: Jun. 11, 2002

(54) LINK ASSEMBLY FOR AUTOMOTIVE SUSPENSION SYSTEM

(75) Inventors: Gerald D. Nickerson, Gibraltar, MI (US); Michael T. Burzawa, Wheeling, IL (US)

(73) Assignee: MacLean-Fogg Company, Franklin Park, IL (US)

( * ) Notice: Subject to any disclaimer, the term of this patent is extended or adjusted under 35 U.S.C. 154(b) by 0 days.

(21) Appl. No.: 09/618,827

(22) Filed: Jul. 18, 2000

(51) Int. Cl.[7] ............... B60G 7/00; B60P 7/00; B62D 7/00; F16B 43/02
(52) U.S. Cl. ............ 280/124.106; 280/124.152; 280/124.177; 411/546
(58) Field of Search ............ 280/124.106, 124.152, 280/124.177; 411/546

(56) References Cited

U.S. PATENT DOCUMENTS

| | | | | |
|---|---|---|---|---|
| 2,859,047 A | * | 11/1958 | Easton | 280/124.106 |
| 3,083,796 A | * | 4/1963 | Bell, Jr. | 411/546 |
| 4,066,278 A | * | 1/1978 | Takagi | 280/124.152 |
| 4,113,278 A | * | 9/1978 | Rissberger | 280/124.106 |
| 4,552,379 A | * | 11/1985 | Foster | 280/76.753 |
| 4,621,831 A | * | 11/1986 | Takadera et al. | 280/124.106 |
| 4,944,523 A | | 7/1990 | Hardy, Jr. et al. | |
| 5,449,193 A | | 9/1995 | Rivard et al. | |
| 5,551,722 A | | 9/1996 | Schwartz et al. | |
| 5,704,631 A | * | 1/1998 | Sparks et al. | 280/124.106 |
| 5,807,010 A | * | 9/1998 | Parker et al. | 280/124.107 |
| 6,007,079 A | * | 12/1999 | Kincaid et al. | 280/124.106 |
| 6,225,566 B1 | * | 5/2001 | Dienst | 411/546 |

FOREIGN PATENT DOCUMENTS

JP        4113913 A    *   4/1992   ......... B60G/21/055

* cited by examiner

Primary Examiner—Brian L. Johnson
Assistant Examiner—Joselynn Y. Sliteris
(74) Attorney, Agent, or Firm—Richard G. Lione; Brinks Hofer Gilson & Lione

(57) ABSTRACT

A link assembly for connecting a stabilizer crank arm and a suspension arm in a vehicle suspension system. The link assembly includes a barrel-shaped spacer having dome-shaped opposite ends. The spacer body has an axial bore therethrough which receives a bolt or stud shaft. The spacer spaces the crank arm and suspension system arm. Grommets on opposite ends of the shaft resiliently hold the arms against the spacer.

5 Claims, 2 Drawing Sheets

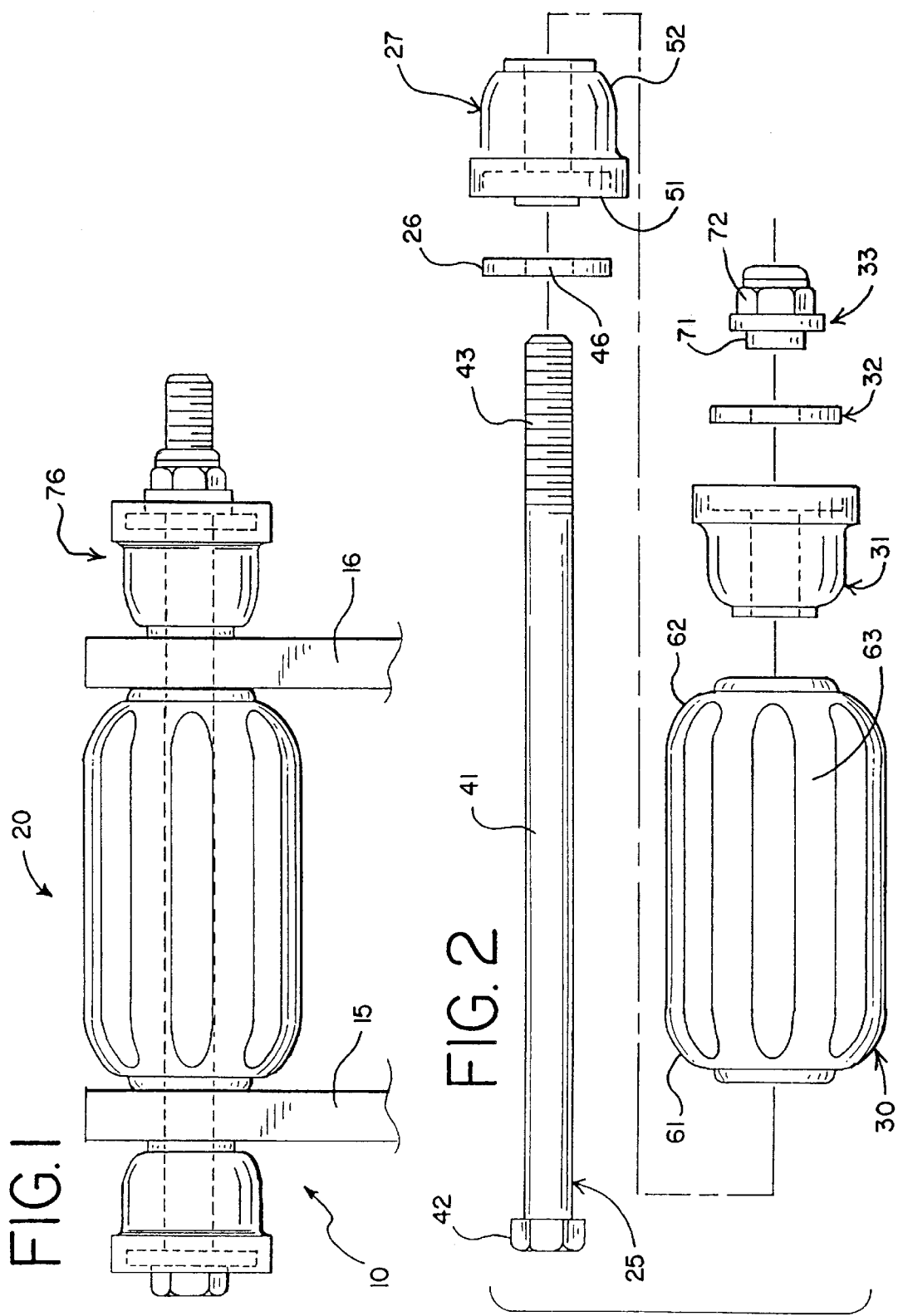

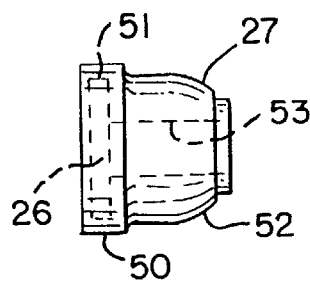
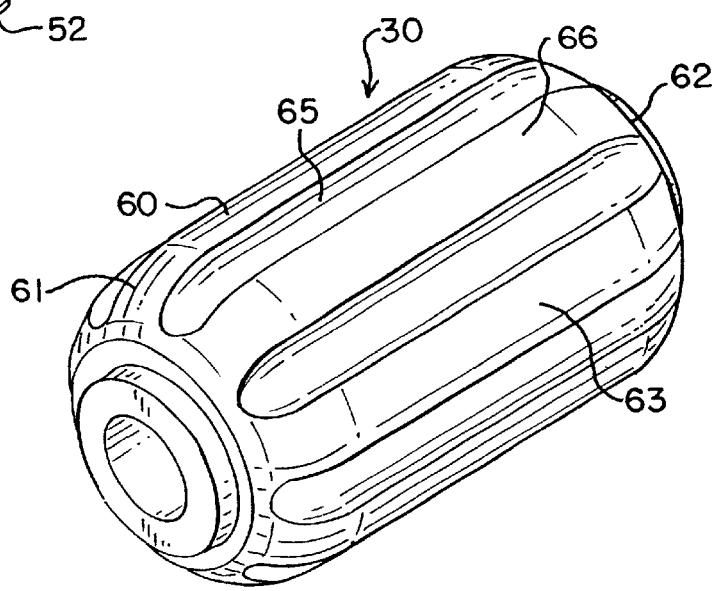
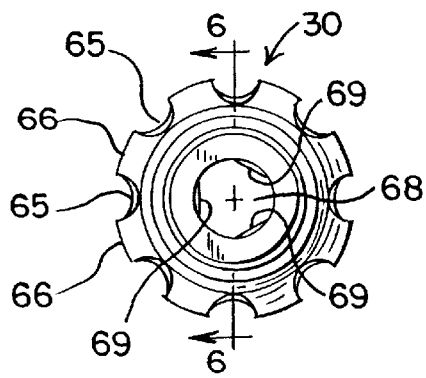
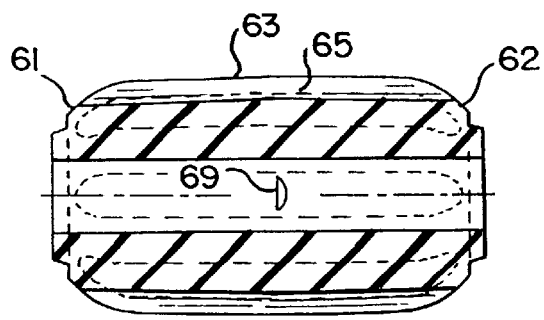
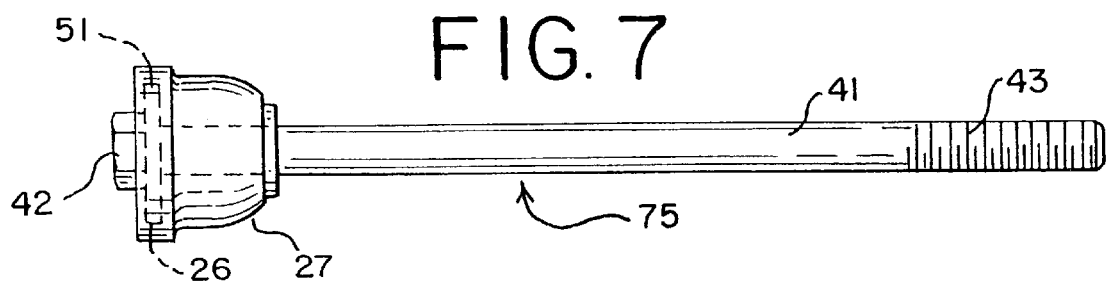

LINK ASSEMBLY FOR AUTOMOTIVE SUSPENSION SYSTEM

FIELD OF THE INVENTION

This invention relates generally to vehicle suspension systems. It relates particularly to a stabilizer bar connector link in a suspension system.

BACKGROUND OF THE INVENTION

Motor vehicles have long been provided with independent suspension systems to absorb road shocks and other vibrations and provide a smoother, more comfortable ride. In suspension systems of this type, a stabilizer bar is normally incorporated to increase the roll rigidity and improve the steering stability of the vehicle. Typically, the stabilizer bar is a torsion rod oriented transversely of the vehicle, with an integral crank arm provided at each end. The rod is rotatably supported from the vehicle body adjacent each crank arm, and each crank arm is coupled to a suspension arm by a connector link assembly.

When the vehicle is subject to forces which cause it to roll, the crank arms pivot relatively about the longitudinal axis of the rod. Torsion forces which are exerted through the crank arms urge the suspension arms of the vehicle back toward their normal position. This type of stabilizer bar acts in a manner such that when paired left and right wheels differ in level from each other due to a cornering maneuver, the vehicle body will be prevented from excessive rolling or leaning to either side by torsional resistance of the stabilizer bar.

The link assembly which connects the torsion bar crank arms to the vehicle body and the suspension arms generally falls into one of two broad categories, a bolt-type assembly or a stud-type assembly. In the bolt-type a suitably dimensioned bolt is used to connect the stabilizer bar to the vehicle suspension arm. Pliable bushings or grommets on the bolt engage the exterior surfaces of the stabilizer bar arms and the vehicle suspension arms. A pair of similarly shaped grommets engage the interior surfaces of the respective vehicle elements and are in engagement with a pair of inner washers which are maintained at a predetermined spaced distance by a cylindrical sleeve mounted on the shaft of the bolt.

The stud-type assembly is essentially the same as the bolt-type. However, it includes two threaded ends requiring the use of retainer nuts on both ends of the stud.

There have been marked improvements in suspension link assemblies during the past ten years. An example of such an improvement is shown in Schwartz et al. U.S. Pat. No. 5,551,722. However, the industry is constantly searching for simpler, more durable, less expensive components. This search applies to suspension links as well as other components.

SUMMARY OF THE INVENTION

An object of the invention is to provide an improved link assembly for a vehicle suspension system.

Another object is to provide a link assembly which is simpler and less expensive than existing link assemblies.

Still another object is to provide a link assembly which is easier to fabricate and install than existing link assemblies.

The foregoing and other objects are realized in a stabilizer link assembly comprising a bolt having a hexagon head at one end of a shaft and a threaded section at the other end. The assembly comprises but six other parts. First, a washer is inserted in an annular groove formed in the flat base of a dome-shaped grommet. The preassembled grommet and washer are then slipped over the threaded end of the bolt shaft and seated against the bolt head. Then, one crank arm of a stabilizer bar, which normally takes the form of a flat bar segment with a hole in it for the bolt, is slipped over the threaded end and seated against the dome end of the grommet.

At this point, a one piece spacer embodying features the invention is slipped over the threaded end of the bolt shaft. The spacer body is molded of elastomeric material, preferably polyurethane, in the shape of a drum having dome-shaped ends. The combination of material, shape and wall thickness makes the drum axially stiff, although the material itself is somewhat elastic. A generally cylindrical bore through spacer is slightly larger in diameter than the diameter of the bolt shaft. However, the bore has three short raised surfaces formed therein which create an interference with the shaft and hold the spacer in position during assembly. One dome-shaped end seats against the stabilizer bar segment.

After the spacer is in place, the vehicles' suspension arm is connected to the assembly. The arm, which normally takes the form of a flat bar segment with a hole in it for the bolt, is slipped over the threaded end and seated against the other dome-shaped end on the spacer.

Next, another dome-shaped grommet is preassembled with a washer. The washer has a hexagon nut already fastened to it. The preassembled grommet, washer and nut are slipped over the threaded end of the bolt shaft and threaded against the suspension bar segment. The nut is threaded onto the bolt shaft threads until it reaches the end of the threads, where the nut is stopped.

Whereas the spacer is described as being axially stiff, the grommets are substantially more elastic. In this regard, they are molded of rubber or the like. They resiliently hold the arms against the spacer.

BRIEF DESCRIPTION OF THE DRAWINGS

The invention, including its construction and method of operation, is illustrated more or less diagrammatically in the drawings, which:

FIG. 1 is a front elevational view of a portion of a vehicle suspension system, illustrating the use of a link assembly embodying features of the present invention;

FIG. 2 is an exploded view of the link assembly of FIG. 1, albeit removed from the suspension system, i.e., as sold and before incorporation into the system;

FIG. 3 is a side view of a grommet and washer sub-assembly for the link assembly; and FIG. 4 is a perspective view of a spacer embodying features of the invention;

FIG. 5 is an end view of the spacer seen in FIG. 4;

FIG. 6 is a sectional view of the spacer taken along line 6—6 of FIG. 5; and

FIG. 7 is a side elevational view of a grommet, washer and bolt sub-assembly for the link assembly.

DESCRIPTION OF THE PREFERRED EMBODIMENT

Referring now to the drawings, and particularly to FIG. 1 a portion of a vehicle suspension system is seen generally at 10. The portion of the suspension system shown includes a stabilizer bar crank arm 15 and a suspension arm 16, connected by a link assembly 20 embodying features of the present invention.

Referring now to FIG. 2, the link assembly 20 is shown in an exploded view before assembly into the suspension system 10. The link assembly 20 includes a hexagon head bolt 25, an inner washer 26, an inner dome-shaped grommet 27, a spacer 30, an outer dome-shaped grommet 31, an outer washer 32 and a hexagon nut 33.

The bolt 25 includes a shaft 41 of predetermined length. The shaft 41 has a threaded end 43 and a hex-shaped head 42. The bolt 25 is preferably fabricated of steel which is plated for corrosion resistance. The threaded end 43 has threads thereon which end on the shaft in a stop for the nut 33.

The washer 26 is fabricated of plated steel or high-strength plastic. It has an aperture 46 formed through its center for receiving the threaded end 43 and shaft 41 of the bolt 25.

Referring now to FIG. 3, the dome-shaped grommet 27 is fabricated of resilient material which is rubber or medium density polyurethane. It has an enlarged outer end 50. An annular groove 51 for receiving the washer 26 is molded into the end 50. The grommet 27 has a roughly semi-spherical inner end 52 which, as will hereinafter be discussed, engages one side of the stabilizer bar crank arm 15 when the system 10 is assembled. A cylindrical bore 53 is formed through the grommet for receiving the bolt 25. The bore 53 contains several inwardly extending nibs (not shown) designed to provide a slight interference fit with the shaft 41.

Referring now to FIGS. 4–6, the spacer 30 is molded of the urethane elastomer TEXIN 245 in the illustrated embodiment. It is molded in an elongated, barrel-shaped body 60 so as to have opposite dome-shaped ends 61 and 62 and a center section 63.

As best seen in FIGS. 4 and 5, the spacer body 60 has a series of eight longitudinally extending channels 65 formed in its outer surface leaving eight ribs 66 between them. The ribs 66 serve to further stiffen the spacer axially while the channels 65 which define them reduce the amount of plastic needed to form the spacer and thus reduce its cost and weight.

A generally cylindrical bore 68 is formed longitudinally through the body 60. The diameter of the cylindrical bore 68 is slightly greater than that of the rod 41 in the bolt 25. Three short raised surfaces 69 are formed in the center of the bore 68, as seen in FIGS. 5 and 6.

The grommet 31 is a mirror image version of the grommet 27. In other words, it is identical in construction to the grommet 27 but faces in the opposite direction in the assembly 20. The washer 32 is identical to the washer 26. It is preassembled into an identical annular groove in the grommet 31.

The hex-nut 33 is a conventional nut with an axially projecting inner flange 71. The hex-shaped end 72 of the nut 33 is outside the flange 71. The flange 71 is inserted into the washer 32 and up set to hold the two together.

The system 10 is assembled by first threading the bolt shaft 41 through a washer 26 and grommet 27 to form a sub-assembly 75. This sub-assembly 75 is seen in FIG. 7. The shaft 41 is then passed through an aperture in the stabilizer bar crank arm 15.

Next, the spacer 30 is slipped over the shaft 41. The shaft is then passed through an aperture in the suspension arm 16. Then the grommet 31, washer 32 and nut 33 sub-assembly 76 are assembled and the nut 33 is threaded on the shaft 41.

The hex-nut 33 is turned onto the threaded section 43 of the bolt 25 until the assembly 20 components and the arms 15,16 are snugly, but not tightly, engaged. The nut 33 is stopped at the end of the threaded section 43. The grommets 27 and 31 resiliently hold the arms 15 and 16 against the spacer 30. The outside diameter of the spacer's barrel shaped body 60 is substantially greater than that of each of the grommets 27 and 31, as seen in FIG. 1. Nevertheless, its dome-shaped ends 61 and 62 permit angular movement of the arms 15 and 16. The arms 15 and 16 are free to move angularly relative to the bolt 25 through angles of about 30°.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A combination in a vehicle suspension system of a stabilizer bar crank arm and a suspension arm and a link assembly connecting them, comprising;
   a) a shaft in said link assembly;
   b) a spacer in said link assembly and having an elongated, generally barrel-shaped body molded in one piece of an elastomeric material with opposite, dome-shaped outer ends;
   c) said shaft extending through a passage and having opposite ends which extend beyond said passage;
   d) a first grommet in said link assembly having a passage therethrough and a second grommet in said link assembly having a passage therethrough;
   e) each of said first and second grommets having a dome-shaped inner end;
   f) one of said opposite ends of said shaft extending through the passage in said first grommet and the other of said opposite ends of said shaft extending through the passage in said second grommet;
   g) said dome-shaped inner ends of said grommets facing corresponding dome-shaped outer ends of said spacer;
   h) said stablizer bar crank arm being held between and against the inner end of the first grommet and one outer end of said barrel shaped body and said suspension arm being held between and against the inner end of the second grommet and the other outer end of said barrel shaped body; and
   i) a member on each of said opposite ends of said shaft for retaining said arms and assembly together.

2. The combination of claim 1 further characterized in that:
   a) said spacer body is molded of polyurethane.

3. The combination of claim 1 further characterized in that:
   a) said spacer body has a plurality of longitudinally elongated depressions formed in its outer surface so as to define longitudinally elongated, radially extending ribs between them.

4. The combination of claim 3 further characterized in that:
   a) said generally barrel shaped body has an outside diameter substantially greater than the outside diameter of each grommet and extends between the opposite, dome-shaped ends on said body.

5. The combination of claim 1 further characterized by and including:
   a) a washer retaining groove formed in each of said grommets;
   b) first and second washers seated in corresponding retaining groves in said first and second grommets;
   c) a head on one end of said shaft against which said first washer is seated; and
   d) a threaded nut on the other end of said shaft engaging said second washer.

* * * * *